April 1, 1924.
O. HOCHBERG
VALVE AND PIPE CLAMP
Filed June 15, 1920
1,488,674
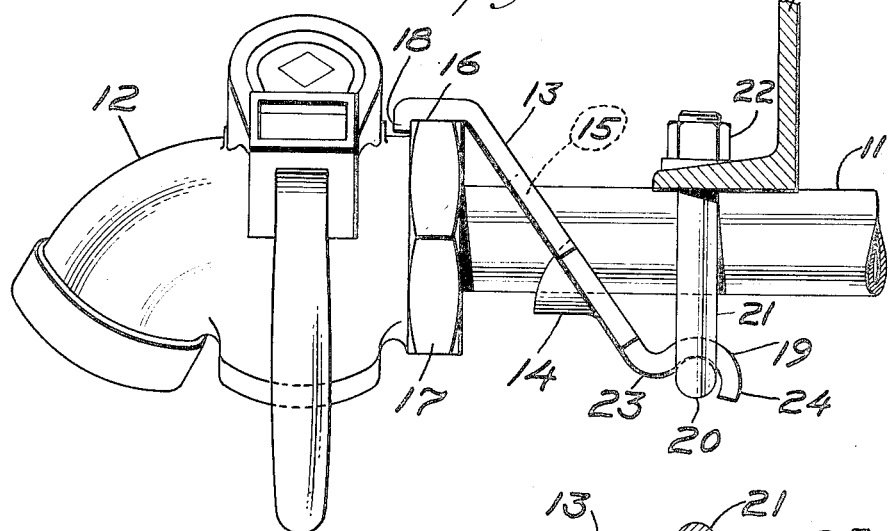
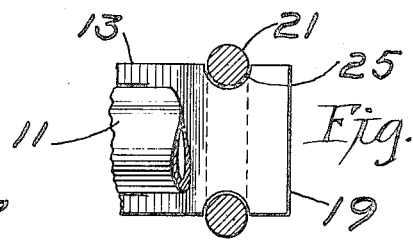
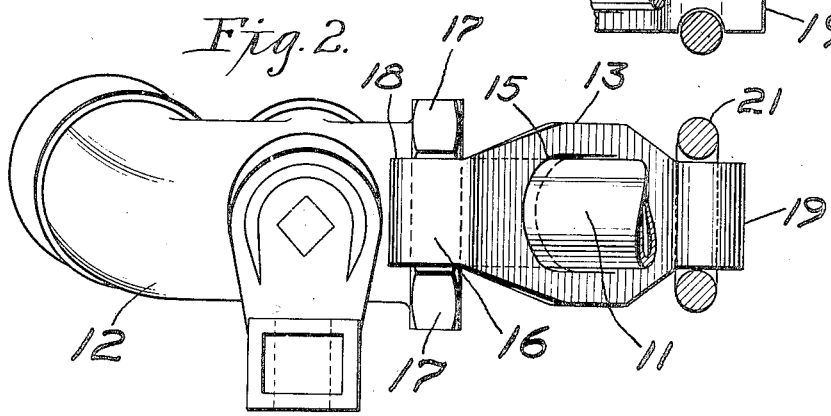
INVENTOR
Oscar Hochberg
BY F. H. Gibbs
ATTORNEY Patented Apr. 1, 1924.

1,488,674

UNITED STATES PATENT OFFICE.

OSCAR HOCHBERG, OF NEW YORK, N. Y., ASSIGNOR TO AMERICAN CAR AND FOUNDRY COMPANY, OF NEW YORK, N. Y., A CORPORATION OF NEW JERSEY.

VALVE AND PIPE CLAMP.

Application filed June 15, 1920. Serial No. 389,145.

*To all whom it may concern:*

Be it known that I, OSCAR HOCHBERG, residing at New York city, county, and State, and being a citizen of the United States, have invented certain new and useful Improvements in Valve and Pipe Clamps, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a side elevational view of the clamp in position on the car end;

Figure 2 is a plan view of same with car and portions of pipe removed to better show the connection between clamp and supporting bolts; and Figure 3 is a similar view showing a modified form of connection between clamp and supporting means.

My invention relates to devices employed in clamping train pipes to the underside of railway cars, the specific embodiment shown being adapted to lock angle-cocks or other valves against accidental separation from the pipes and to prevent relative rotation of pipes and angle-cocks.

One object of my invention is to provide a device of the kind referred to in which the clamping action on pipe and valve is applied at points remote from the supporting means.

Another object is to provide an attachment for pipes and valves which will rigidly secure the valve to pipe and both to the body of the car.

The valve is threaded on to the train pipe and supports the flexible hose and coupling (not shown) commonly employed for connecting similar pipes on adjoining cars, and is arranged a prescribed distance from center line of car coupler and from the plane of face of the coupler striking plate. To accommodate the increase in the size of the coupler heads of the heavy couplers now in use, the Master Car Builders' Association has recently recommended an increase in the distance requirements hitherto prescribed. Such requirement will cause both valve and pipe to extend to a point quite remote from the valve and pipe supporting means. Devices heretofore considered amply sufficient for the purpose are found deficient in transmitting clamping action to valve and pipe portions so far removed from the fastening means. By means of the device hereinafter to be described, the clamping action on the valve may be as great or greater than the force applied at the supporting means.

Other objects and advantages will appear from an examination of the drawing in which 10 represents a car end or bracket extension thereon and to which train pipe 11 is secured. To pipe 11 is fitted the usual angle-cock 12 or the like which supports an air-hose and coupling (not shown) to permit connection of pipe to that of adjacent car. The valve is held to the pipe, and the pipe to the car 10 by means of a rigid clamp 13 fulcruming on the pipe at bearing 14 and perforated at 15 to receive the pipe.

Pipe clamp 13 which may be of wrought or cast metal is provided at its valve end with a clamping portion 16 adapted to engage one or more faces 17 of the valve. The valve end of clamp 13 is also provided with a depending lip 18 adapted to engage the valve to prevent longitudinal movement of same upon the pipe and prevent shifting of both pipe and valve longitudinally of the car body. The opposite end 19 of clamp 13 is shaped or otherwise adapted to engage supporting means 20 for holding the entire mechanism to the car, and said supporting means may be of any approved form, that in the drawing being shown as a U-bolt having no direct supporting contact with pipe or valve and provided with sides 21 extending through car part 10 and adjustably held by means of nuts 22 threaded thereon.

To prevent separation or shifting of clamp end 19 upon supporting means 20, said end may be shaped as shown in Fig. 1 with portions 23 and 24 positioned on opposite sides of said supporting means 20, or said end may be perforated or notched as shown at 25 in Fig. 3.

With clamp 13 is position with bearing 14 against the underside of pipe 11, an upward pull on end 19 through the medium of support 20 will be transmitted downwardly upon the valve 12 at the opposite end 16 of said clamp with a pressure varying according to position of fulcrum 14 upon the pipe or to intensity of the upward pull upon supporting means 20.

Portion 16 of clamp 13 should be made with its valve engaging face extended to provide sufficient clearance to accommodate possible variations in the lengths of the protruding pipe-ends.

The clamp 13 is preferably made in one piece of suitable shape. It intersects with and completely surrounds the pipe upon which it is mounted, thereby preventing loss of clamp in event of failure of the supporting means.

What I claim is:

1. The combination with a pipe and valve and supporting means therefor, of a clamp fulcrumed on the pipe and engaging said valve and supporting means, said supporting means being out of direct supporting contact with said valve or pipe.

2. The combination with a pipe and valve and supporting means therefor, of a clamp fulcrumed on and intersecting the pipe and engaging said valve and supporting means, said supporting means being out of direct supporting contact with said valve or pipe.

3. The combination with a pipe and valve and supporting means therefor, of a clamp fulcrumed on the pipe and engaging said valve and supporting means, said clamp intersecting said pipe at the fulcrum point.

4. The combination with a pipe and valve and supporting means out of direct supporting contact therewith, of a clamp fulcrumed on the pipe and engaging said valve and supporting means, said clamp intersecting said pipe at the fulcrum point.

5. A pipe clamp and valve holder forming a unitary member adapted to receive a pipe, a pipe passing through and intersecting the holder and fitted with a valve, said holder being fulcrumed on the pipe and provided with an end shaped to engage the upper side of said valve, and supporting means at the opposite end of said holder.

6. The combination with a pipe fitted with a valve, of a member fulcrumed upon and intersecting said pipe, supporting means at one end of said member, said member being formed with opposite ends adapted respectively to engage said valve and supporting means.

7. The combination with supporting means on the car, of a pipe fitted with a valve, a clamping member fulcrumed on the pipe intermediate said valve and supporting means and having its opposite ends in engagement with said valve and supporting means.

8. The combination with supporting means on the car, of a pipe fitted with a valve, a clamping member fulcrumed on the pipe intermediate said valve and supporting means and having its opposite ends adapted to prevent relative movement of valve and supporting means.

In witness whereof I have hereunto set my hand in the presence of two witnesses.

OSCAR HOCHBERG.

Witnesses:
R. W. SMITH,
JOSEPHINE MITCHELL.